United States Patent [19]

Chapman et al.

[11] 4,383,357
[45] May 17, 1983

[54] METHODS OF ALIGNING PARAMAGNETIC ARTICLES

[75] Inventors: James S. Chapman, Lee's Summit; Anthony Tedeschi, Raytown, both of Mo.

[73] Assignee: Western Electric Co., Inc., New York, N.Y.

[21] Appl. No.: 254,725

[22] Filed: Apr. 16, 1981

[51] Int. Cl.³ .............................................. H01H 11/00
[52] U.S. Cl. ............................................. 29/622; 29/467; 29/744; 29/756; 29/759; 228/49 R; 269/8; 269/43
[58] Field of Search ................. 29/744, 759, 756, 467, 29/436, 602 R, 622, DIG. 105, 464; 228/49 R; 335/285, 286; 269/8, 13, 43, 296, 303

[56] References Cited

U.S. PATENT DOCUMENTS

| 2,920,595 | 1/1960 | Gertz | 29/744 |
| 3,501,825 | 3/1970 | Alexander et al. | 29/203 |
| 3,539,323 | 11/1970 | Marlin et al. | 65/139 |
| 3,628,242 | 12/1971 | Zollman | 29/622 |
| 4,062,620 | 12/1977 | Pirolli | 350/96 |
| 4,079,927 | 3/1978 | Rocton | 269/296 |
| 4,204,310 | 5/1980 | Auracher et al. | 29/464 |

FOREIGN PATENT DOCUMENTS 737189 12/1977 U.S.S.R. ................................ 29/744

Primary Examiner—Carl E. Hall
Assistant Examiner—P. W. Echols
Attorney, Agent, or Firm—W. O. Schellin

[57] ABSTRACT

Paramagnetic articles such as a stem (14) and an armature (17) are placed into mutual coextensive alignment with a gap (19) of a predetermined width between adjacent portions of such articles. To repetitively establish the predetermined gap between successive groups of such articles, a first of such articles is guided tangentially into a magnetic field. A resulting force on such article (14) draws the article against a first stop surface. The article becomes magnetically polarized, such that when the second article, such as the armature (17) is guided into coextensive alignment with the first article, the second article becomes attracted to the first article to be drawn against a stop surface opposite to and spaced from the first stop surface by a dimension equal to the predetermined gap width.

4 Claims, 5 Drawing Figures

METHODS OF ALIGNING PARAMAGNETIC ARTICLES

TECHNICAL FIELD

This invention relates to aligning paramagnetic articles and to a holder for such articles. The invention is described with respect to aligning component parts of mercury-wetted sealed contact switches prior to joining such parts into subassemblies of such switches. It should be noted, however, that the invention can be applied advantageously to handling various paramagnetic articles other than the component parts of the mercury-wetted sealed contact switches which are used herein merely as an example.

BACKGROUND OF THE INVENTION

In the development of small, fast-acting components, maintaining close tolerances becomes a problem. For example, in the manufacture of miniature mercury-wetted sealed contact switches the magnetic reluctance through the switches is changed by a variation in a small gap between an armature and a stem to which the armature is pivotably mounted.

In such a miniature switch, the armature is mounted at one end through a reed spring to the stem. The spring flexes to support the pivotal movement of the armature. However, for the armature to be able to pivot, a gap must exist between the armature and the stem. As the armature swings from one end of its range of movement to the other, the gap width increases or decreases.

In comparison to larger switches, miniature switches typically have much faster operating speeds in that less time is required to close or open their contacts in response to an electrical input pulse. Yet, to take advantage of such faster operating speed, tolerances for establishing, for example, the gap width between the armature and the stem become more critical. A seemingly small change in the gap width between the armature and the stem of a miniature switch may represent a relatively large percentage change in the gap width and, hence, may result in a significant deviation from a desired operating characteristic of the switch.

It is, therefore, desirable to establish methods of precisely aligning component parts, such as the stem, the armature and the spring with respect to each other, and to precisely control their alignment during their assembly into a subassembly of the switch.

SUMMARY OF THE INVENTION

In accordance with this invention, paramagnetic articles are aligned by guiding first articles tangentially into a magnetic field. The articles are restrained by a non-magnetic spacer from becoming centered with respect to a plane of symmetry of the magnetic field, whereby the articles are urged with a positive force against the spacer. Second paramagnetic articles are guided into coextensive alignment with said first articles across the width of the spacer. The ends of said second articles thereby become attracted to adjacent ends of the first articles across the width of the spacer.

BRIEF DESCRIPTION OF THE DRAWING

Various features and advantages of the present invention may be best understood from the following detailed description of a preferred embodiment of the invention, when reference is made to the accompanying drawing, wherein.

DETAILED DESCRIPTION

Figure 1:
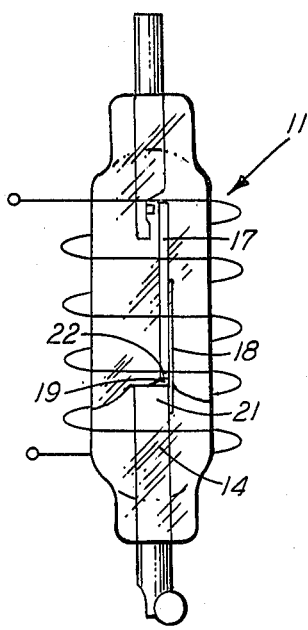
FIG. 1 is a simplified representation of a miniature mercury-wetted sealed contact switch as a typical example of product to which the invention advantageously applies.

Referring to FIG. 1, there is shown a simplified representation of a mercury-wetted sealed contact switch, which is designated generally by the numeral 11. U.S. Pat. No. 4,114,006 to Tedeschi, which is assigned to the assignee of this application, explains in detail the structure and operation of a typical switch, such as the switch 11. For a better understanding of the type of product to which the present invention advantageously applies, the above-mentioned patent, U.S. Pat. No. 4,114,006, is incorporated by reference herein.

Of particular interest in the further description of the present invention are an electrode or stem 14, an armature 17 and one or more reed springs 18. In assembling the stem 14 to the armature 17 with the spring 18 as a bridging element, it becomes desirable to maintain a small gap 19 between an inner end 21 of the stem 14 and an adjacent end 22 of the armature 17. The gap 19 allows the armature to swing inward toward a central axis through the stem 14 without hindrance from the wall of the stem 14.

Any variation in the width of the gap 19 from a given gap width has at least some effect on the operating characteristics of the fully assembled switch 11. Both the stem 14 and the armature 17, as well as the spring 18, are typically chosen to have good paramagnetic characteristics. The term "paramagnetic" is used herein in the sense of "being attracted to a magnet." In the presence of a magnetic field, the component parts, namely the stem 14, the armature 17 and the spring 18, become polarized in the direction of the magnetic field and they themselves appear to be magnets. On the other hand, a material such as aluminum, while it may have under some definitions paramagnetic properties, is considered to be a nonmagnetic rather than a paramagnetic material for purposes of this description.

Since the component parts of the switch 11, namely the stem 14 and the armature 17, are good magnetic flux conductors, the width of the gap 19 represents a significant reluctance in the magnetic path. Some flux lines, of course, are conducted through the spring 18. However, because of the preferably small material thickness of the spring 18, the flux path through the spring becomes readily saturated such that any additional flux lines have to bridge the gap 19 between the stem 14 and the armature 17. The reluctance of the gap 19, however, increases as it becomes wider. Therefore, the gap width of the gap 19 is preferably kept to a minimum, such as a preferred 0.076 mm, for example.

It is readily realized that as dimensions of manufactured items decrease, it becomes increasingly difficult to maintain tolerances on such dimensions in terms of small percentages of such dimensions. For example, a decrease in the width of a 0.1 mm gap of 0.013 mm represents a change of 13% while a similar decrease in the width of a 0.076 mm gap represents a 17% change from the nominal gap width. Such changes result in corresponding changes in the sensitivity and response time of the switch 11. Problems in the assembly of a large number of the component parts, such as the stem 14, the armature 17 and the spring 18 were overcome or avoided by an alignment technique using features found in a holder 26, which is pictorially represented in FIG. 2.

Figure 2:
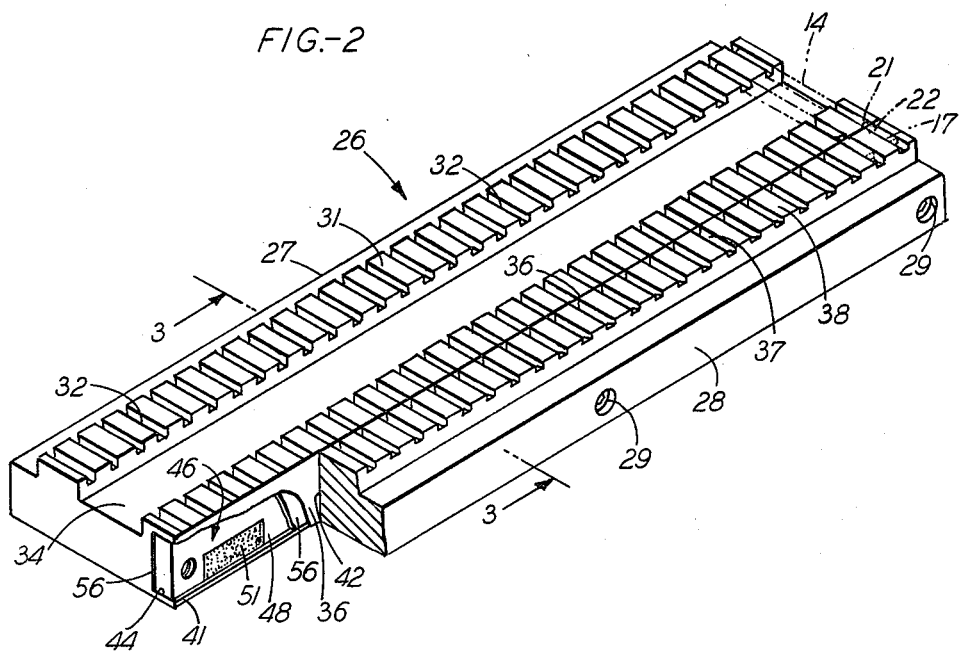
FIG. 2 is a pictorial representation of a holder including features of the present invention for aligning component parts prior to their assembly into a switch as shown in FIG. 1.

Referring now to FIG. 2, the holder 26 is preferably of a compound structure. For convenience, a first support 27 is removably mounted to a second support 28 through a number of fasteners, such as the three screws 29. The first and second supports 27 and 28 receive and guide a plurality of the stems 14 and of the armature 17, respectively, into alignment with each other. The first support 27 has on a top surface 31, and a plurality of parallel, evenly spaced grooves 32 extending perpendicularly to the length of the support 27. The grooves 32 are of a width and of a depth to retain, with a minimum of sliding clearance, the stems 14.

In the particular embodiment shown in FIG. 2, the holder 26 and, consequently, the first support 27 have an overall length of about 152 mm; and, thirty of the grooves 32 are equally spaced at about 5 mm intervals. The embodiment of FIG. 2 also shows a longitudinal recess 34 which exceeds the depth of the grooves 32 and separates each groove 32 into two sections. This recess 34 is included for conveniently unloading the stems 14 and the armatures 17 after they have been joined by welding the springs 18 to the stems and to the armature.

The second support 28 is mounted to the first support 27 in abutting alignment, however, the two supports 27 and 28 are physically separated from each other by the thickness of a spacer or shim 36. A plurality of grooves 37 located in a top surface 38 of the second support 28 are coextensively aligned with the grooves 32 in the first support 27. However, the shim 36 extends substantially to the top surfaces 31 and 38 to block off communication between the grooves 32 and 37.

The shim 36 is sandwiched tightly between two adjacent end surfaces 41 and 42 of the respective supports 27 and 28. A longitudinal recess 44 which is preferably located in the end surface 41 of the first support 27 holds a magnet structure or assembly 46.

Figure 3:
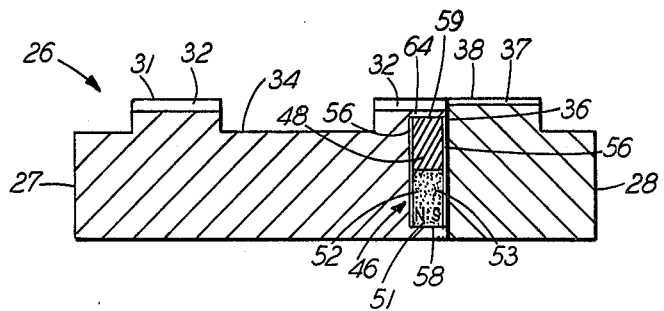
FIG. 3 is a cross section through the holder shown in FIG. 2.
Figure 4:
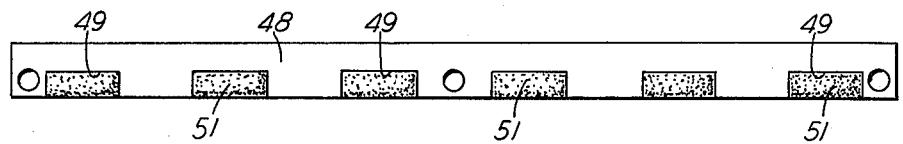
FIG. 4 shows a magnet assembly which is advantageously used in accordance with certain features of the present invention in the holder of FIG. 2.

The magnet assembly 46 is best described in reference to FIGS. 3 and 4. It is desired to generate a magnetic field with curved flux lines in planes parallel to the direction of the grooves 32 and 37, such that the grooves pass tangentially through a portion of the field. To avoid any noticeable deflection of the field by the first and second supports 27 and 28, the material of the supports is a nonmagnetic material, such as plastic or aluminum. Aluminum is preferred because of its machinability and its dimensional stability.

The magnet assembly 46 includes several components, the combination of which gives the effect of a long bar magnet having a desired fringing field through the grooves 32 and 37. The assembly 46 includes a magnet holder or frame 48 of a nonmagnetic material. In the preferred embodiment, the frame 48 is a bar of the same length as the holder 26. Along the length of the frame 48, there are six preferably rectangular cutouts 49, each of which holds a magnet 51, as shown in a side view of the frame 48 in FIG. 4.

The direction of magnetization of the magnets 51 extends across the thickness of the frame 48 between first and second opposite poles 52 and 53. While the polarity of the magnets is identified in FIG. 3 as extending in a certain direction indicated by "N" and "S" it is to be understood that the polarity of all of the magnets 51 may be reversed without affecting their function. Soft steel strips 56 lie flat against each side of the frame 48 to become the polepieces of the assembly 46. The strips 56 are magnetically drawn against the magnets 51 and hold the structure 46 together as a unit. The strips 56 distribute the flux field from the individual magnets 51 such that a more uniform field fringes around a lower end 58 and an upper end 59 of the assembly 46.

The direction of the magnetic flux field extends in planes substantially parallel to the direction of the grooves 32 and 37. Thus, when the stems 14 are placed into the grooves 32 the magnetic field urges the stems toward a position of symmetry with respect to the field and pushes the one end 21 of each of the stems against the shim 36. The magnetic force also holds the stems 14 in the grooves 32.

Within the magnetic field, the stems 14 become polarized to function as apparent magnets. Thus, when the armatures 17 are inserted into the grooves 37 of the second support 28, the armatures 17 become attracted to the stems 14 and the adjacent end 22 of each of the armatures moves into contact with the shim 36. The thickness of the shim 36 is carefully chosen in that it represents the desired width of the gap 19.

Referring again to FIG. 3, the recess 44 holding the magnet assembly 46 is preferably separated by a wall 64 from the bottom of the grooves 32. Spacing the magnet assembly 46 away from the grooves 32 is not essential, of course, particularly since the influence of the field increases with decreasing spacing between the stems 14 and the magnet assembly 46. However, spacing the magnet assembly 46 by the thickness of the wall 64 tends to subject each of the stems 14 and armatures 17 more uniformly to the magnetic field.

Furthermore, maintaining some separation between the magnet assembly 46 and the stems 14 and armature 17 prevents excessive field concentrations in the grooves 32 and 37. While the material of the stems 14 and the armatures 17 is selected for its low magnetic remnance, these components are likely to become weakly magnetic by an exposure to a strong magnetic field, e.g., through a temporary direct contact with a magnet. Any magnetization of the stems or the armatures could, however, have detrimental effects in that fine, paramagnetic particles could become attracted to the stems 14 or the armatures 17 to become ultimately assembled into the switches 11. Any loose paramagnetic particles sealed into the switches 11 tend to become attracted, however, to regions of greatest flux concentrations within the switches 11. Thus, the abrasiveness of such paramagnetic particles and their ability to stick to contacts and bridge such contacts would tend to cause those switches to fail.

It is, therefore, important to prevent the components, such as the stems 14 and the armature 17, from directly contacting a magnet. An alternate embodiment, wherein the shim 36 itself is a magnet with opposite poles on opposite major surfaces consequently has been found to be less suitable than the described, preferred embodiment. The resulting magnetic field of such alternate embodiment and the simplicity of its structure seems desirable. However, an increased risk of magnetizing the stems 14 and the armatures 17 weighs against its implementation. In addition, it has been found that a magnetized shim 36 tends to atract paramagnetic or magnetic particles which then tend to lodge in the grooves 32 and 37 on either or both opposite surfaces of the shim 36. The presence of the particles, however, in most instances alters the spacing between the stems 14 and the armatures 17, such that the assembly of the armatures 17 to the stems through the springs 18 does not meet requirements. The described holder 26, however, is easily cleaned of particles in a routine manner such as, for example, with a conventional air gun.

Figure 5:
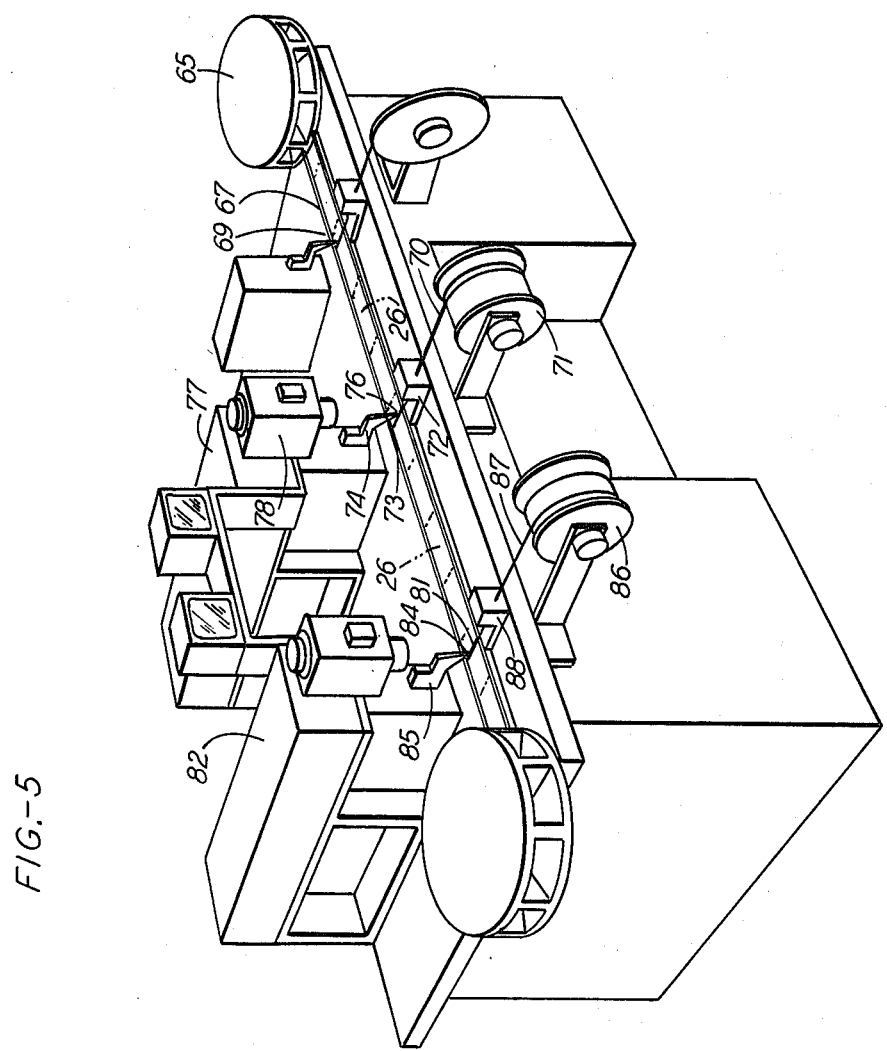
FIG. 5 is a representation of an apparatus for assembling component parts of a mercury switch after alignment of the component parts in accordance with the present invention.

The features of the holder 26 are useful in, for example, a sequential laser welding operation, which is best described in reference to FIG. 5. After the stems 14 are loaded into the holder 26, the holder is advanced from a rotating feed magazine 65 in abutting alignment with other holders 26 along a track 67 of a typical assembly apparatus 68. The armatures 17 are preferably loaded sequentially into the respective grooves 37 as the holders 26 are indexed past a load station 69. Because of the comparatively small sizes of the stems 14, the armatures 17 and the springs 18, a laser welding technique is preferred to attach the springs 18 to the armatures 17 and the stems 14.

The apparatus 68 in FIG. 5 preferably feeds a strip 70 of material for the springs 18 from a reel 71 to a cutoff station 72. At the cutoff station 72, a vacuum holder 73 mounted to a transfer arm 74 attaches to an end portion of the strip 70, whereupon the end portion is separated from the strip 70 and becomes the spring 18. The transfer arm 74 reciprocally moves between the cutoff station 72 and a bond station 76 where the spring 18 is placed against one of the stems 14 and a corresponding one of the armatures 17.

In the described, preferred embodiment the spring 18 is held by the vacuum holder 73 while a first laser 77 pulses to direct energy through a typical optical system 78 to a predetermined weld site on the spring 18. Even though the vacuum holder 73 is retaining the spring 18 during the time when such laser weld is made, the paramagnetic properties of the spring 18 and the armature 17 aid the spring 18 in being drawn into contact with the armature 17. As a result of such reproducibly good contact between the spring 18 and the armature 17, consistently good laser welds have been experienced.

After a first laser weld, the vacuum to the holder 73 is shut off and the transfer arm 74 reciprocates to the cutoff station where a subsequent spring 18 is picked up. The holder 26 is now indexed to align an adjacent stem 14 and armature 17 arrangement in the respective grooves 32 and 37 with the bond station 76.

As the holder advances incrementally, each of the stems 14 and the armatures 17 with the springs 18 bonded thereto index sequentially into alignment with a second bond station 81. The second bond station 81 duplicates substantially the bond station 76 except that its laser 82 is trained on a bond site where the spring 18 is overlying the stem 14. Similarly advantageous as with respect to the first bond, the magnetic, field-induced forces in the stem 14 aid in drawing the spring 18 into direct contact with the stem 14. However, to assure a consistently good contact, a vacuum holder 84 on a second transfer arm 85 again retains the spring 18, such that a good weld can be produced between the springs 18 and the stems 14.

Of course, the operation of the apparatus 68 is described as an exemplary assembly technique only, and many changes in the apparatus or in the described welding technique are possible without departing from the spirit and scope of the invention. For example, if it is desired to assemble the stem 14 and the armature 17 with a second spring 18 such as a damping spring in the manner described in U.S. Pat. No. 4,114,006 to Tedeschi, the order of welding the spring first to the armature 17 and then to the stem is best reversed. Then, in preparation for making the second weld at the second bond station 81, a second reel 86 feeds a second strip 87 to a second cutoff station 88, where the second vacuum holder 84 mounted to the second transfer arm 85, advances another spring 18 to the bond station 81 in a manner identical to the operation of the first transfer arm 74 at the bond station 76.

When the second spring 18 is placed in superposition with the first spring 18, the magnetically induced forces again cause the springs 18 to attract each other, and both springs are aligned and held in contact with the stem 14 and the armature 17. It has been found that a laser weld can be made simultaneously through both springs 18 to bond, if it is so desired, both springs 18 to the armature 17 as shown in the above-mentioned patent. In holding the springs 18 with the vacuum holders 73 and 84 while making a laser bond, an access aperture, about 0.6 mm in diameter, through each of the holders was found sufficient to provide access for the laser beam to make the desired weld.

It is further possible to weld the second spring 18 to the stem 14 simultaneously with making a second weld on the first spring 18 after the first spring 18 has been welded to the armature 17 at the bond station 76 as described herein above. Other changes and modifications are possible in the physical appearance of the holder. It is, for example, possible to perform the described alignment and assembly procedures with the aid of a rotary holder.

The holder 26 may, for example, be modified to have the shape of a wheel. Grooves, similar to the grooves 32 and 37 may then be formed on a cylindrical periphery of such a wheel. Preferably, the wheel would rotate about a horizontal axis. In such an alternate embodiment, loading the stems 14 and the armatures 17 would be performed in an upper arc section of the wheel, while the welded assemblies of the stems, the armatures and the springs would preferably be unloaded near the bottom of the wheel to take advantage of gravitational forces in loading and unloading articles such as the stems 14 and the armatures 17.

Various other changes can be made to the described methods and apparatus without departing from the spirit and scope of this invention.

What is claimed is:

1. A method of aligning a plurality of paramagnetic articles for assembly, which comprises:
    guiding a plurality of first articles into positions spaced from each other, and tangentially to a magnetic field to induce magnetism within such first articles;
    restraining a longitudinal movement of such first articles with a nonmagnetic spacer to prevent such first articles from becoming centered with respect to a plane of symmetry of said magnetic field, whereby one end of each of said first articles is urged against said spacer; and guiding each of a plurality of second articles into coextensive alignment with one of said plurality of first articles, whereby an adjacent end of each of said second articles is magnetically drawn toward an adjacent end of a respective one of said first articles and into contact with said spacer to become spaced from the adjacent end of the respective first article by the thickness of the spacer.

2. A method of aligning a plurality of paramagnetic articles according to claim 1, wherein the articles are elongate articles and guiding a plurality of first articles into positions, comprises:

loading said first articles from a magazine into parallel first grooves of a holder such that the one end of each of said first articles extends into a region above two spaced magnetic polepieces, said groove being closed at one end thereof by the spacer such that the one end of each of the loaded articles is urged by the magnetic field of the poles toward the spacer.

3. A method of aligning a plurality of paramagnetic articles according to claim 2, wherein guiding each of a plurality of second articles comprises:

loading each of said plurality of second articles into a plurality of parallel second grooves which extend in linear alignment with said first grooves across from said spacer, such that the loaded second articles are drawn into linear, spaced alignment with said first articles.

4. A method of aligning a plurality of paramagnetic articles according to claim 3, further comprising:

placing a plurality of third paramagnetic articles across a gap between the adjacent ends of said first and second articles, the magnetic force induced in said first and second articles drawing such third articles into alignment with said first and second articles.

* * * * *